United States Patent
Kanemaru et al.

(10) Patent No.: US 7,471,874 B2
(45) Date of Patent: Dec. 30, 2008

(54) REPRODUCING APPARATUS AND METHOD

(75) Inventors: Takashi Kanemaru, Yokohama (JP); Sadao Tsuruga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 796 days.

(21) Appl. No.: 11/117,715

(22) Filed: Apr. 29, 2005

(65) Prior Publication Data
US 2006/0083486 A1 Apr. 20, 2006

(30) Foreign Application Priority Data
Oct. 15, 2004 (JP) ............................. 2004-300889

(51) Int. Cl.
H04N 5/93 (2006.01)
(52) U.S. Cl. .................. 386/68; 386/124; 386/E5.028
(58) Field of Classification Search .................. 386/68, 386/124, 46, 112, 125, 111; 375/240.26, 375/240.28
See application file for complete search history.

(56) References Cited

U.S. PATENT DOCUMENTS

| 5,574,567 | A | * | 11/1996 | Cookson et al. ............... 386/46 |
| 5,751,887 | A | * | 5/1998 | Nitta et al. ..................... 386/68 |
| 5,754,241 | A | | 5/1998 | Okada et al. |
| 6,009,231 | A | * | 12/1999 | Aoki et al. ..................... 386/68 |
| 6,993,251 | B1 | * | 1/2006 | Phillips et al. ............... 386/125 |
| 7,274,863 | B2 | * | 9/2007 | Ando ........................... 386/112 |
| 7,343,087 | B2 | * | 3/2008 | Ishioka et al. ............... 386/124 |
| 2002/0146233 | A1 | * | 10/2002 | Barton et al. .................. 386/46 |
| 2003/0165323 | A1 | * | 9/2003 | Demas et al. .................. 386/68 |
| 2004/0042767 | A1 | * | 3/2004 | Defrance et al. ............ 386/111 |
| 2004/0240874 | A1 | * | 12/2004 | DiRisio ....................... 396/349 |

FOREIGN PATENT DOCUMENTS

| JP | 08-032927 | 2/1996 |
| JP | 08-331560 | 12/1996 |
| JP | 2003-101962 | 4/2003 |
| JP | 2003-101962 A | 4/2003 |
| JP | 2003-324690 | 11/2003 |
| JP | 2003-324690 A | 11/2003 |
| JP | 2004-112176 | 4/2004 |
| JP | 2004-282325 | 10/2004 |
| JP | 2004-282325 A | 10/2004 |
| JP | 2004-336332 A | 11/2004 |

* cited by examiner

Primary Examiner—David E Harvey
(74) Attorney, Agent, or Firm—McDermott Will & Emery LLP

(57) ABSTRACT

For reproduction of transport stream (TS) from a recording medium, it is necessary to control the reproduction so as not to overflow the decoder buffer at the time of starting the reproduction and or when switching to the normal reproduction from special reproduction. At the times of starting the TS reproduction from a recording medium and switching between the normal reproduction and the special reproduction, selection is made as appropriate between a reproduction technique which performs stream output with timing similar to the input timing used for recording, and another reproduction technique which monitors data amount stored up in a decoder buffer and controls stream output in accordance with the controlled data amount.

18 Claims, 7 Drawing Sheets

REPRODUCING APPARATUS AND METHOD

This application claims the benefit of Japanese Application No. 2004-300889 filed in Japan on Oct. 15, 2004, the disclosure of which also is entirely incorporated herein by reference.

TECHNICAL FIELD

The techniques disclosed herein relate to a reproducing apparatus and method which reproduce data streams, and more particularly to control of the reproduction in order to realize comfortable image and audio reproduction.

BACKGROUND

Recently, various digital equipment such as TV receivers and personal computers which are capable of recording TV broadcasts on recording media such as a hard disk (hereinafter referred to as an HDD) and a blue-ray disc and viewing them at a later date are available in the marketplace. Technologies for compressing and decompressing data are mandatory for efficient processing of vast amounts of data, like that of TV broadcasts. The MPEG (Moving Picture Experts Group) systems are the international standards for data compression and decompression. Japanese broadcasts employ as the standard the MPEG2 system which is considered to be applied to video communication systems or broadcasting systems. In particular, these broadcasts employ the format called the MPEG2 transport stream (hereinafter referred to as the MPEG2-TS) which is suitable for data transmission and storage under circumstances where errors are caused during transmission. The MPEG2-TS transmits data while embedding a standard reference value or a Program Clock Reference (PCR) of the system in the data, to ensure reproduction on the receiving side in the manner intended by the transmitting side. Likewise, data concerning time management information, such as a Program Time Stamp (PTS) that is referred to at the time of reproducing and a Decoding Time Stamp (DTS) that is referred to at the time of decoding, is also embedded before the data is transmitted.

Operations for receiving and reproducing broadcast waves with a receiver are as follows. A Program Association Table (PAT) and a Program Map Table (PMT) are acquired from a Transport Stream (TS), and a target Program Identifier (PID) is identified for a desired program carried in the transport stream from the PMT table. TS packets having the identified PID are acquired, and the packet data is separated into video, audio and PCRs. The default value of System Time Clock (STC) at the receiver is set by using the received PCR, and an error in the 27-MHz system clock frequency which will be the time base for decoding is adjusted by comparing PCR and STC values that are received periodically. The STC counter which creates a clock in the reproducing apparatus increases STC values at a constant rate according to the system clock frequency. Decoding is performed at the time when the STC value coincides with the DTS attached to the each video data, and displaying is made at the time when the STC value coincides with the PTS attached to video or audio data.

The TS stream may be transmitted in a state where a plurality of programs are multiplexed according to the MPEG2-TS format. In a recording operation, recording is executed by extracting only the TS packets of content to be recorded from a received TS stream. To ensure reproduction from a recording medium, it is necessary not only to record audio and video data, but also to record time information, such as PTS showing display time and a DTS showing decoding time and a PCR which is the time information of the transmission side, all of which are attached to the audio and video data.

For reproduction of a TS from a recording medium, it is possible to output the TS with timing similar to the TS input timing at the time of recording and to execute reproduction. An alternative reproduction technology using a reproduction system that monitors data amount stored in a decoder buffer and adjusts inputs from the recording medium according to the data amount has been disclosed in U.S. Pat. No. 5,754,241A. With the latter reproduction method, an STC value of the decoder is used as the reference value of operation, which is effective in special reproduction as stipulated by the MPEG (Moving Picture Encoding Group) Standards. For example, displaying of only I pictures one after another in sequence can easily be realized by increasing the STC value, which increases continuously under normal circumstances, in steps according to time intervals of the I pictures.

SUMMARY

For a TS that is recorded in a medium like an HDD, etc., when reproduction is executed using the same procedures as those for reproducing broadcast waves, a problem will be caused if the method for outputting a TS from the HDD is for a reproduction technique which monitors data amount stored in a decoder buffer and adjusts inputs from the recording medium according to the data amount (hereinafter referred to as the flow control reproduction). The details will be described with reference to FIG. 1.

FIG. 1 is a schematic diagram showing a difference between a reproduction system which outputs TS with timing similar to the input timing of TS at the time of recording (hereinafter referred to as the "time stamp reproduction") and the flow control reproduction. Reference numeral 101 shows a difference in inputs between the time stamp reproduction and the flow control reproduction for a reproduction process of an MPEG decoder. An arrow mark shown on the upper part shows reproduction procedures of the MPEG decoder in time series, and output timing of data in the time stamp reproduction is shown beneath the time-series line with right diagonal line shadings. In the time stamp reproduction, data is output in pieces in a way similar to the input timing of packets selected from a received transport stream at the time of recording. On the other hand, in the case of the flow control reproduction, as shown further below with left diagonal line shadings, data is continuously output as long as the decoder continues its requests.

Reference numeral 102 is a schematic diagram showing TS packets that are output from a recording medium in a row of packets. Assume for discussing purposes that data is output from the recording medium sequentially starting from a TS packet 1 shown on the right side. For the time stamp reproduction, preparation to set a PCR for the STC will be completed before reaching the portion shown with the arrow A, and a PCR is assigned to a STC value with timing that a TS packet X which is PCR data is entered to the decoder.

On the other hand, for the flow control reproduction, data is output up to the portion shown with an arrow B since the data input speed is fast, and setting is made to the STC value when a TS packet Y which is PCR data is entered. In flow control reproduction, the output rate can be set from the recording media in advance, although in timestamp reproduction output rate is limited to the speed which synchronizes with the time stamp. As a result, at the time of starting decoding, DTS/PTS of video/audio data from TS packets 1 to Y-1 which were buffered prior to the packet Y is smaller than the preset STC counter value in case of flow control reproduction. This means that the acquired PCR corresponds to the TS packet Y, but the DTS/PTS of packets to be decoded corresponds TS packets 1, for example. Therefore, the packet remains undecoded, or decoding/outputting is executed by force without ensuring acquisition of correct time information. Thus output is made under the out-of-sync status between the audio and video data, which gives an uncomfortable feeling to the viewer.

In addition, reference numeral 103 is a diagram showing a case where, in the flow control reproduction, the data amount of packets up to Y-1 is larger than the data amount which makes an MPEG decoder buffer overflow. As shown by reference numerals 1 to 4 in the diagram 103, when a nearly overflow status is detected (reference 1), the MPEG decoder requests a unit to control outputs from a recording medium to stop inputting (reference 2). Consequently, it is possible that since the recording medium completely stops outputting (reference 3), the decoder cannot set PCR for the STC value (reference 4), thereby stopping the reproduction process.

A method for solving these problems might involve increasing the STD buffer of a decoder to an adequate size, but that method is, however, not practical because of the cost.

The present technique is made as a result of taking the above-stated circumstances into consideration, and an object of the technique is to ensure reproduction/special reproduction from an HDD in processes similar to those for reproducing broadcast waves.

The present teachings relate to a reproducing apparatus and a reproduction method for solving the problems stated above, wherein time stamp reproduction and flow control reproduction are selectively performed as appropriate. For example, when reproduction is started, or when fast-forwarding is switched to normal reproduction, which needs synchronization of video with audio, inputting of TS from the recording media to the decoder with the timestamp reproduction is executed in the same manner as is the case with reproduction of broadcast waves. It is therefore possible to prevent the problem in that decoding is stopped due to overflow of the STD buffer. In addition, a PCR is set for a STC value with appropriate timing according to the data amount of TS to be input. This enables reproduction with established AV (audio and video) synchronization immediately after start of outputting.

Thereafter, reproduction is executed by switching to the flow control reproduction after a given length of time. In this way, by combining the time stamp reproduction and the flow control reproduction as appropriate, it is possible to execute normal reproduction from a recording medium while ensuring synchronization between the video image and the voice and execute special reproduction such as fast forwarding and slow-motion reproduction.

According to the present technique, it is possible to execute reproduction in a favorable status.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitations. In the figures, like reference numerals refer to the same or similar elements.

DETAILED DESCRIPTION

Figure 1:
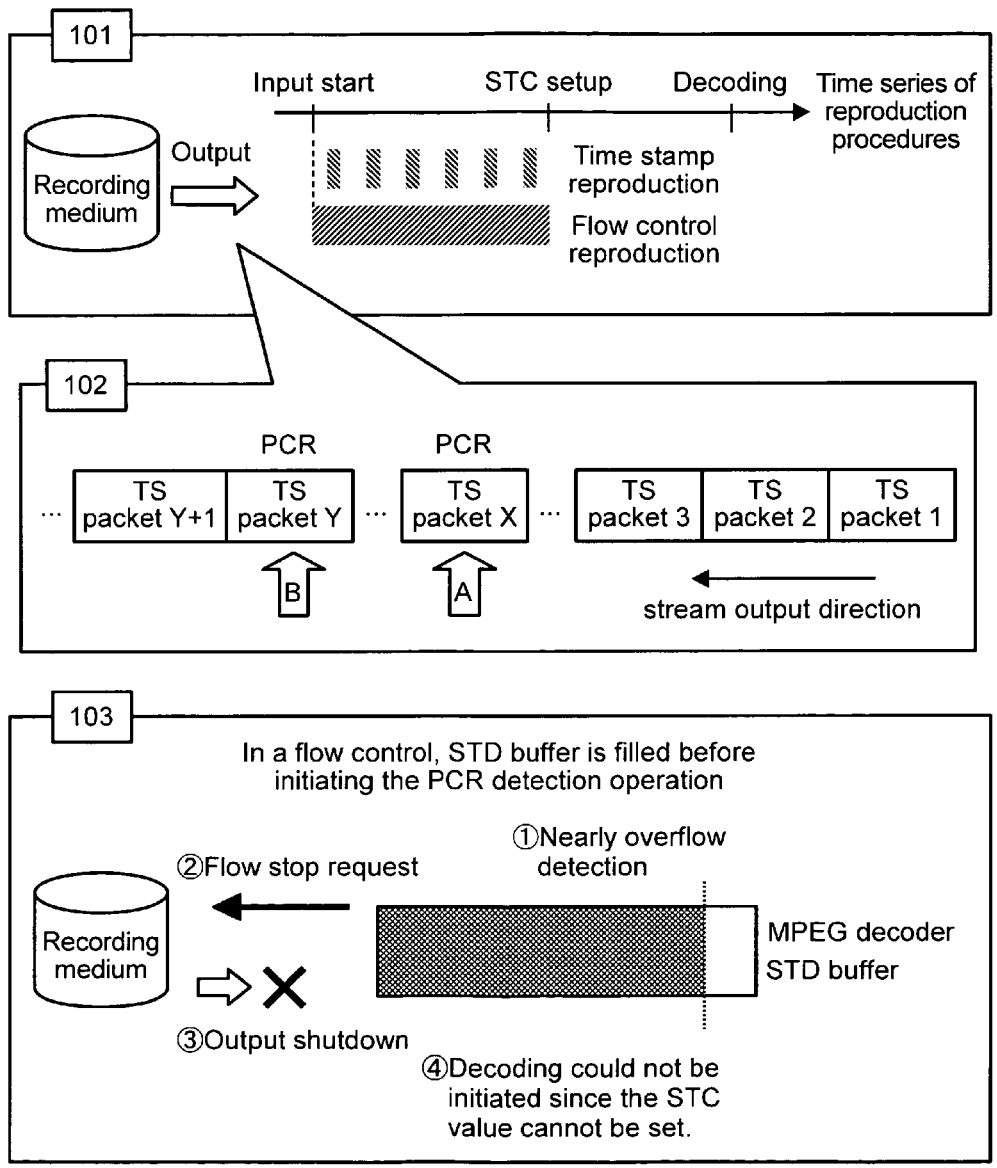
FIG. 1 is a schematic diagram for describing the problem to be solved by the present technique.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

In the following embodiments, description will be made by taking an apparatus which records and reproduces MPEG2-TS used for transmission of present broadcast to an HDD as an example. Note that the following is an example for describing the present technique and is not intended to limit the scope of the present technique to the variations shown in the drawings or discussed in this detailed description. The present technique can be executed in various digital recording/playback apparatuses other than the embodiments described hereunder.

Since broadcast waves are transmitted by multiplexing a plurality of programs in one TS, they contain PSI (Program Specific Information) which shows the relationship between programs contained and elementary streams which configure the TS. It is possible for a decoder to pick up a random program by analyzing the PSI. Various methods can be conceived since no definite regulation is available regarding how the TS should be recorded in an HDD. However, in the embodiment, it is assumed that recording is executed in a format that only streams making up a program to be recorded are extracted from a broadcast wave in which a plurality of programs are multiplexed according to the MPEG2-TS format as stated above (hereinafter referred to as "partial TS"). Packets of the received stream that contain materials of other programs are discarded during the recording operation.

Figure 2:
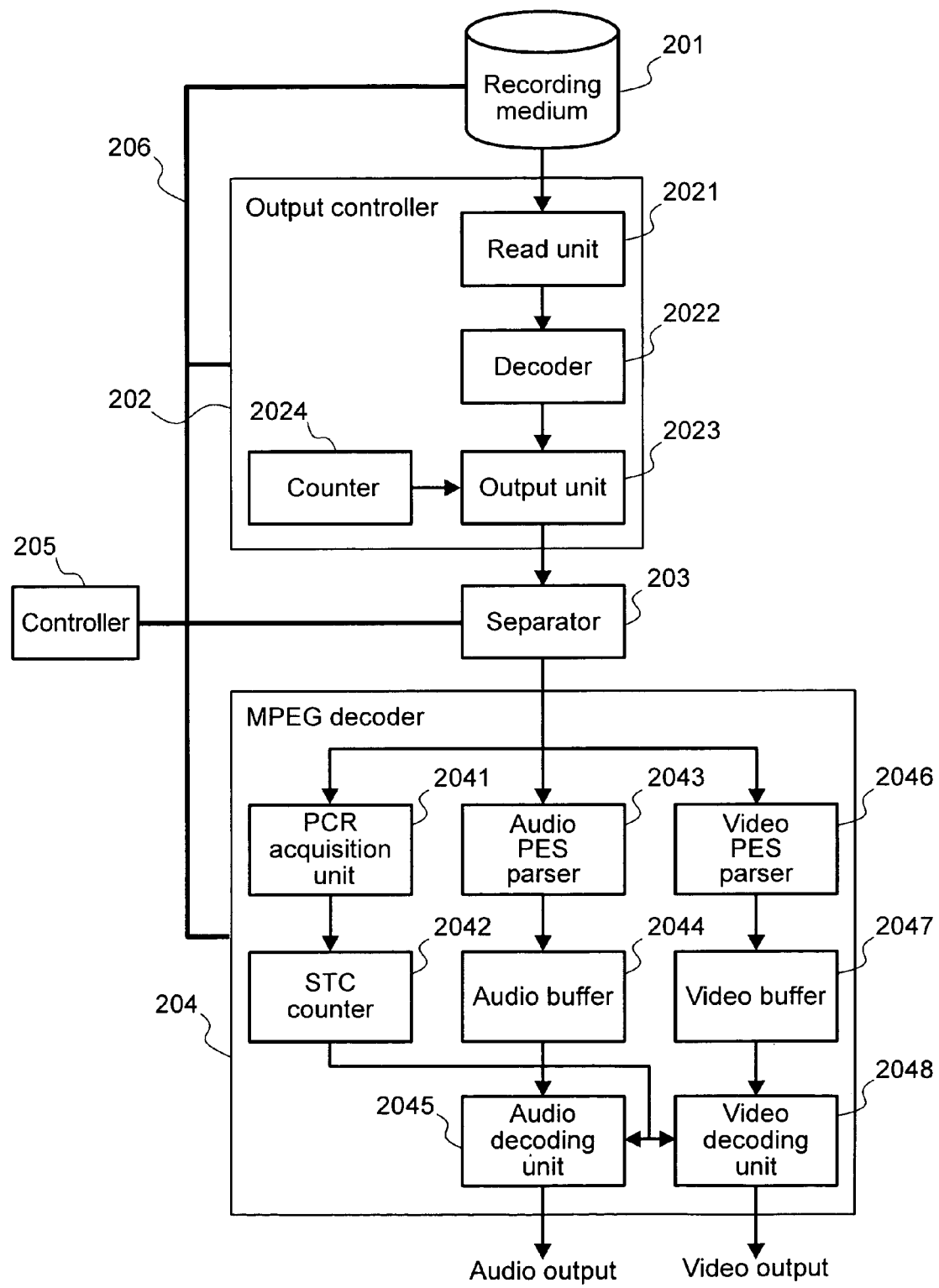
FIG. 2 is a schematic diagram showing a system configuration of a reproducing apparatus according to an embodiment of the present technique.

FIG. 2 is a block diagram showing a configuration example of a reproducing apparatus. Operations in the embodiment covering up to decoding of prescribed TS from a recording medium will be described with reference to FIG. 2. In the figure, the reproducing apparatus includes a recording medium 201, an output controller 202, a separator 203, an MPEG decoder 204, a controller 205 and a system bus 206. Further, the output controller 202 includes a read unit 2021, a decoder 2022, an output unit 2023 and a counter 2024. Furthermore, although not shown in the diagram, a buffer to absorb a processing speed error exists in the pre-stage of each processing unit. The MPEG decoder 204 includes a PCR acquisition unit 2041, an STC counter 2042, an audio parser 2043, an audio buffer 2044, an audio decoding unit 2045, a video parser 2046, a video buffer 2047 and a video decoding unit 2048. Although not shown in the diagram, a buffer exists in the pre-stage of the output stage. The disk drive or tape drive is the module that handles the medium, e.g. to read a data recorded on the medium. The driving module in turn connects to or includes an output controller 202. The control module includes controller 205 and also can include a separator 203. The decoding module includes a decoder 204. Those skilled in the art will recognize that some or all of these modules can be implemented as software running on a programmable processor or the like to perform the stated functions.

In the embodiment, it is assumed that a broadcast wave is received at an input unit which is not shown in FIG. 2, and data is written in the recording medium 201 in an encrypted partial TS format. The recording medium 201 is a recording medium which records partial TS, and it executes recording in a manner to enable various special reproductions, in addition to normal recording, such as continuous display of I pictures only (one of fast forward type replay), for example, by recording and managing leading positions of GOP (group of picture) streams to be stored simultaneously.

The output controller denoted at 202 is adaptable to output the partial TS from the recording medium, and it reads a TS to be reproduced from the recording medium 201 and transmits the TS to the separator 203. The output controller 202 transfers random partial TS from the recording medium 201 to the decoder 2022 with the read unit 2021. Encryption decoding in the recorded data is executed in the decoder 2022. The output unit 2023 outputs the decoded data, either by the time stamp reproduction technique or the flow control reproduction technique. The counter 2024 counts up time information at the time of reproduction to use the information as the reference time of the time stamp reproduction.

For the time stamp reproduction technique, time information of the partial TS to be reproduced is compared with the time information generated by the counter 2024, and PES packet in the TS, in which both of the time information coincide with each other will be output sequentially.

For the flow control reproduction technique, data is sequentially read from the recording medium when a request for partial TS output is received from the MPEG decoder 204 via the controller 205. In this case, the time stamp attached will be ignored, so as to execute more rapid output than the time stamp reproduction. When a request for stopping output of partial TS is received from the MPEG decoder 204, reading from the recording medium is stopped. By repeating the steps, data outputting according to decoding capability of the MPEG decoder 204 ("flow control") is realized.

The separator 203 analyzes a TS to be delivered from the output controller 202 and separate the TS into video, audio, time information and other additional information. The separator 203 transmits the data thus separated to the MPEG decoder 204.

The MPEG decoder 204 executes the following processing by using signals of respective data separated by the separator 203 as inputs. The MPEG decoder 204 acquires a time stamp contained in the TS in the PCR acquisition unit 2041 and sets the time stamp to time information of the system. The STC counter 2042 periodically counts up the time information thus set and transmits the information to the audio decoding unit 2045 and the video decoding unit 2048. Then, the MPEG decoder analyzes the video data that is input by the video PES parser 2046 and stores the data in the video buffer 2047. In the video decoding unit 2048, decoding is executed when the time information transmitted from the STC counter 2042 coincides with the DTS contained in the video data, and the video data is output to the trailing video output stage when the time information coincides with the PTS. Audio data is analyzed in the audio PES parser 2043 and is stored in the audio buffer 2044. The audio decoding unit 2045 executes audio output when the time information transmitted from the STC counter 2042 coincides with the PTS contained in the audio data.

The MPEG decoder 204 establishes a setting as to whether or not a flow control signal used for the flow control reproduction is transmitted. The reproduction procedures remain the same for transmitting/not transmitting the flow control signal. After start of the reproduction procedures, when the PCR obtained during the initial stage is set for the STC value, the STC counter will count up time at a constant rate thereafter. The decoding unit executes decoding/outputting based on the time information of the STC counter. When a flow control signal is transmitted, the MPEG decoder 204 keeps monitoring the data amount of the video buffer 2047 and/or the audio buffer 2044 included in the MPEG decoder. In addition, the MPEG decoder 204 issues a request for stopping partial TS output to the output controller 202 via the controller 205 when the data amount accumulated in the buffer becomes larger than a given threshold value or exceeds a threshold value. Likewise, when the data amount in the buffer reaches a given threshold value or below or less than a threshold value, the MPEG decoder 204 issues a request to initiate a TS output to the output controller 202. By repeating the above-stated processes alternately, it is possible to keep a decodable state, and synchronously output audio and video.

The controller 205 controls each of the above-stated modules to control the whole system. For switching between the time stamp reproduction and the flow control reproduction, a command is issued from the controller 205 to execute the switching. The system bus 206 delivers a command from the controller 205 to each unit as well as information from each unit to the controller. Reproduction procedures for synchronizing audio and video, and outputting the partial TS that is input from the recording medium 201 will be described hereunder by using the apparatus described above.

Hereinafter, processes for initiating normal reproduction will be described.

Figure 3:
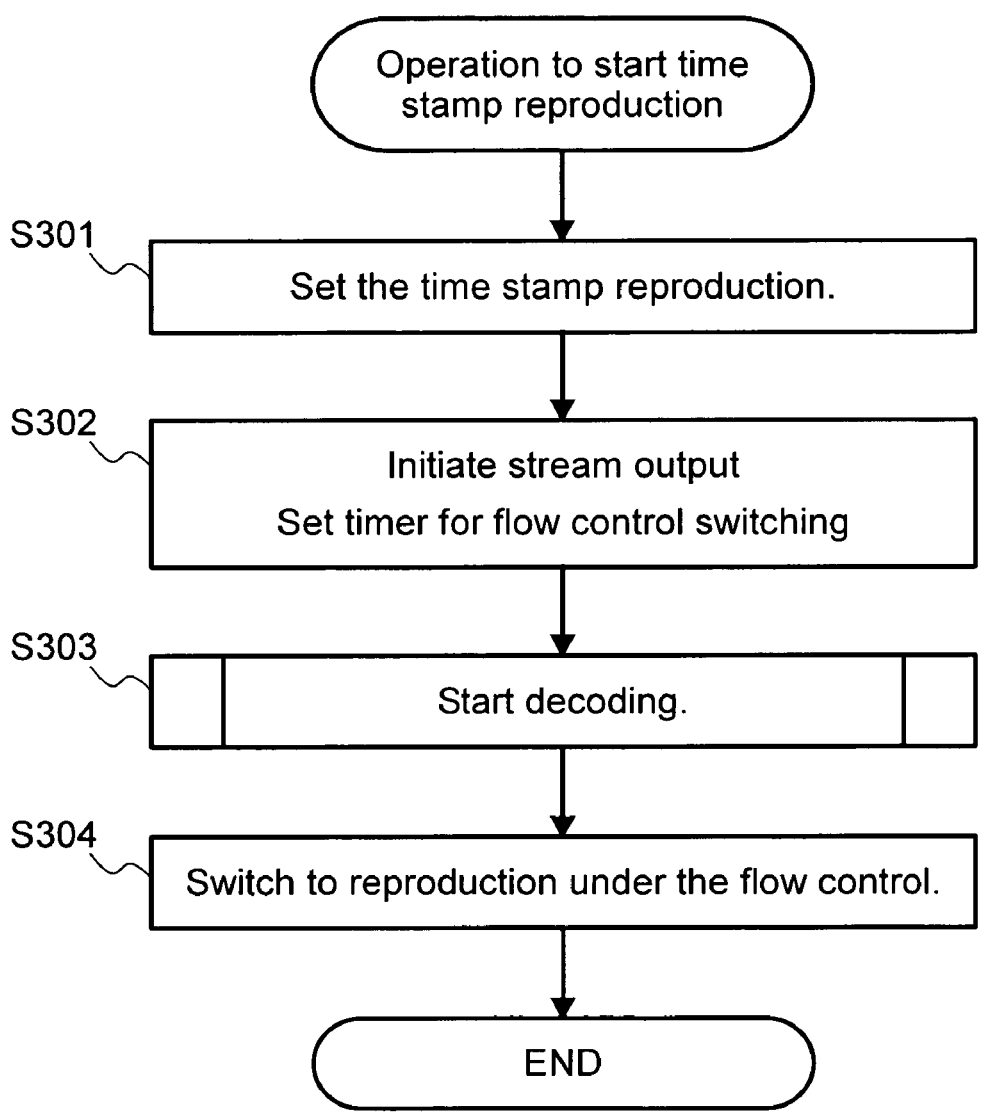
FIG. 3 is a flow chart showing a method for initiating reproduction according to the embodiment of the present technique.

FIG. 3 is a flow chart showing processes of the apparatus at the time of initiating reproduction. When an instruction is made from external input equipment, for example, such as a remote controller to reproduce a random partial TS that is recorded on the recording medium 201, the controller 205 notifies the output controller 202 of the information on the target stream.

In Step (hereinafter abbreviated as "S") 301, the time stamp reproduction is set up in the output controller 202, and then the step moves to S302. The recording medium 201 controls the position of an I picture in recorded data. The partial TS is output based on the stored position of the I picture.

In S302, the output controller 202 initiates output of the partial TS from the recording medium 201 by using the time stamp reproduction based on a program to be reproduced according to the information received from external instruction, and sets timer for switching the reproduction to the flow control reproduction. Then, the step moves to S303. For the wait time to be set, a value exceeding the time required by the MPEG decoder to initiate reproduction will be set. Although no regulation is stipulated concerning reproduction from a recording medium for the processing time required for initiating decoding, time which ensures execution of decoding should be investigated in advance, and given wait time of one second, for example, should be set.

In S303, the controller 205 issues a reproduction initiation command to the MPEG decoder 204. The MPEG decoder 204 initiates decoding/outputting of audio and video. Then, the step moves to S304. In S304, when time has elapsed for the timer setting in S302, the controller 205 switches the process of the controller 202 to the flow control reproduction from the time stamp reproduction. This completes the processes.

Figure 4:
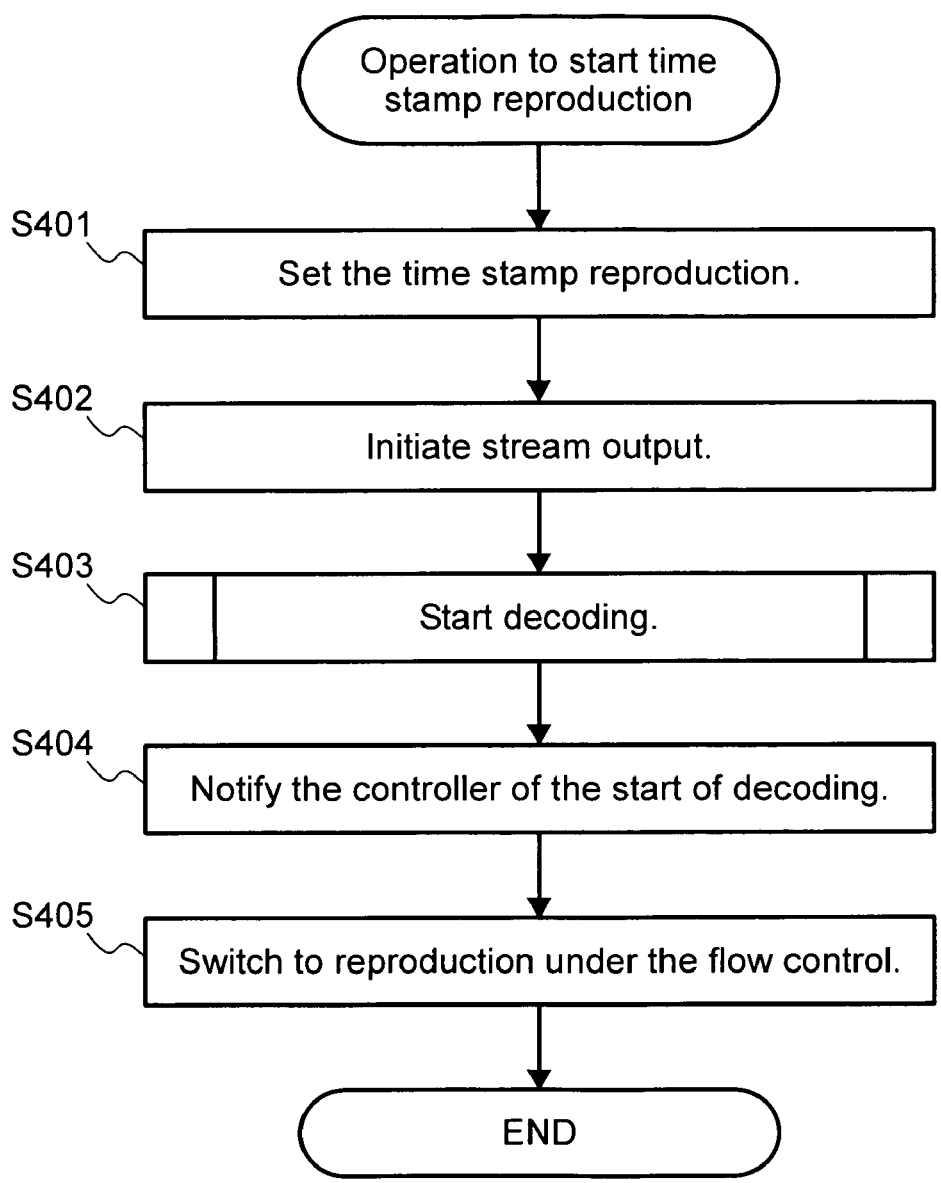
FIG. 4 is a flow chart showing that the same effect can be achieved even if part of the processes of the flow chart shown in FIG. 3 is changed.

In the flow chart shown above, wait time is provided by the output controller 202, and the output controller 202 and the MPEG decoder 204 operate in an asynchronous manner. However, the same effect can be realized by the following arrangement. Instead of the above-stated process, the fact that outputting is initiated by synchronizing audio and video in the MPEG decoder 204 is notified to the output controller 202 via the control bus 206 and the controller 205; and after the receipt of the notification, the method for outputting partial TS is switched to the flow control reproduction. FIG. 4 shows a flow chart showing a case where the process is replaced.

In S401, a process similar to S301 is executed. In S402, as is the case with S302, the output controller 202 initiates outputting of partial TS, but the step moves to S403 without setting timer. In S403, control similar to S303 is executed, and the MPEG decoder 204 initiates an output process. Then the step moves to S404, wherein the fact that the MPEG decoder 204 has initiated outputting of audio and video is notified to the controller 205. In S405, as is the case with S304, the controller 205 switches the process of the output controller 202 to the flow control reproduction. This completes the process.

After outputting from the recording medium 201 is initiated, if the MPEG decoder 204 continues the non-decoded status for a long period of time, the video buffer 2044 and/or the audio buffer 2047 will overflow. Non-decoded status occurs before decoding or when the controller 205 stops decoding. When overflow occurs, the MPEG decoder 204 could conceivably operate to discard excessive data sequentially starting from the oldest data. However, as stated above, if outputting from the recording medium 201 is initiated by using the time stamp reproduction technique, the input bit rate will be similar to or lower than that of the broadcast wave. Therefore, if the sequence is similar to the case where the reproduction initiation process of the controller 205 and the MPEG decoder 204 reproduces the broadcast wave, reproduction becomes possible without allowing the buffer to overflow, even if the sizes of the video buffer 2044 and the audio buffer 2047 are not changed.

Once the reproduction method is set to the flow control reproduction through the above-stated processes, subsequent reproduction will be executed under the flow control reproduction procedures until the user makes an operation to stop reproduction or until it becomes necessary to synchronize audio and video again by switching the reproduction method, or, unless otherwise the partial TS input from the recording medium is discontinued.

Figure 5:
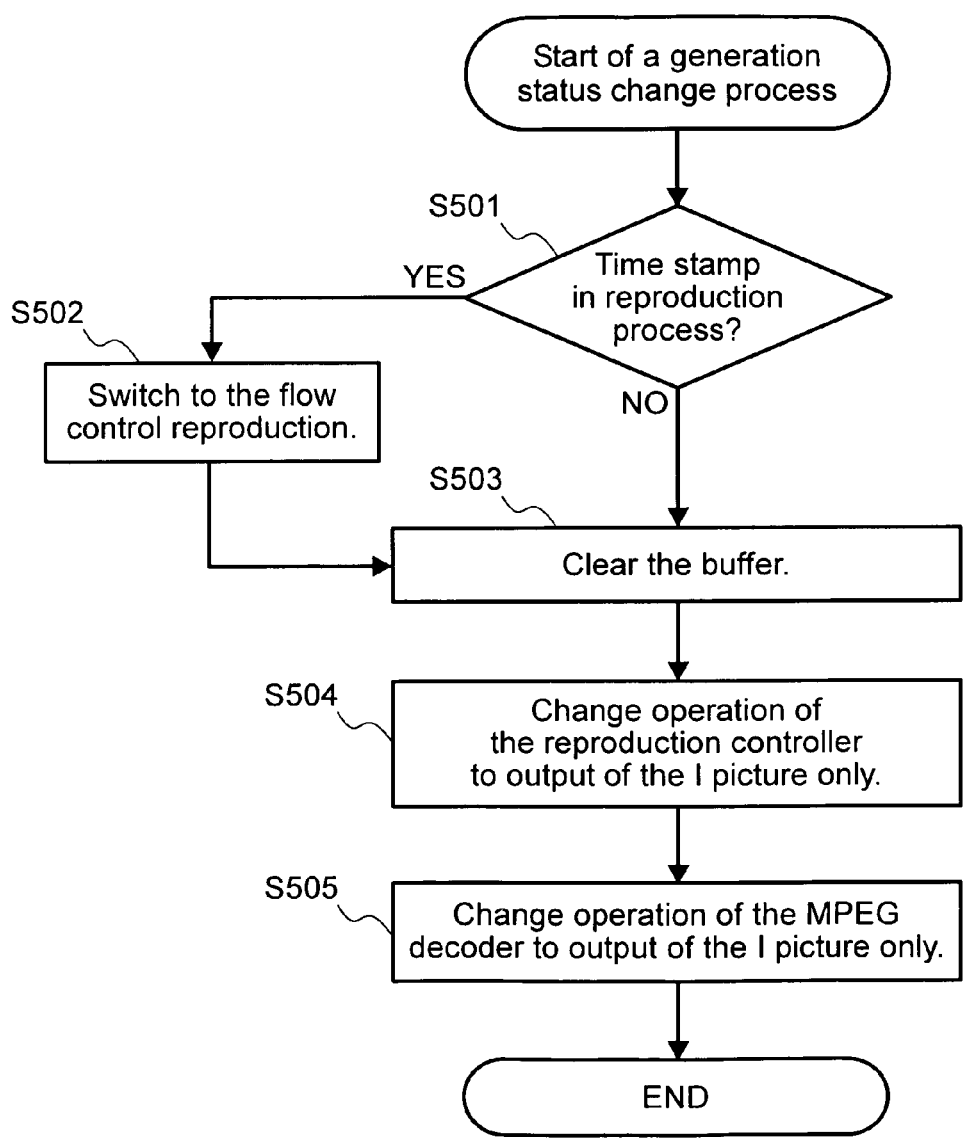
FIG. 5 is a flow chart showing procedures for switching to the flow control reproduction according to the embodiment of the present technique.

Hereinafter, a control process will be described for a case where, after start of the normal reproduction, a user operates a remote controller to switch the reproduction status. FIG. 5 shows procedures for a case where switching is made from the normal reproduction to a search process which displays only an I picture without executing audio outputting.

If the current reproduction method in S501 is of the time stamp reproduction technique, the step moves to S502, and if it is of the flow control reproduction, the step moves to S503. In S502, the process of the output controller 202 is switched to the flow control reproduction technique. Then, the step moves to S503. In S503, the buffer included in the output controller 202, and the video buffer 2044 and the audio buffer 2047 in the MPEG decoder are cleared. Then, the step moves to S504. In S504, the output controller 202 changes the method for outputting TS from the recording medium. Then, the step moves to S505. In addition, the output controller 202 changes the process in a manner that an I picture position in the recorded data to be subsequently output for each process can be acquired and data having a size including the number of I pictures can be output from the acquired position in the recorded data to the decoder. In S505, the reproduction method of the MPEG decoder is changed from the controller 205 in a manner that, for video images, only the I pictures can be decoded/output, and voices will not be decoded/output. This completes the process. Even for a case of switching to a special reproduction other than the one described above, or more specifically, when switching is made from the status where reproduction is executed while synchronizing audio and video to the reproduction status where no synchronization is required, the reproduction will be switched to the flow control reproduction by using similar processing procedures.

Figure 6:
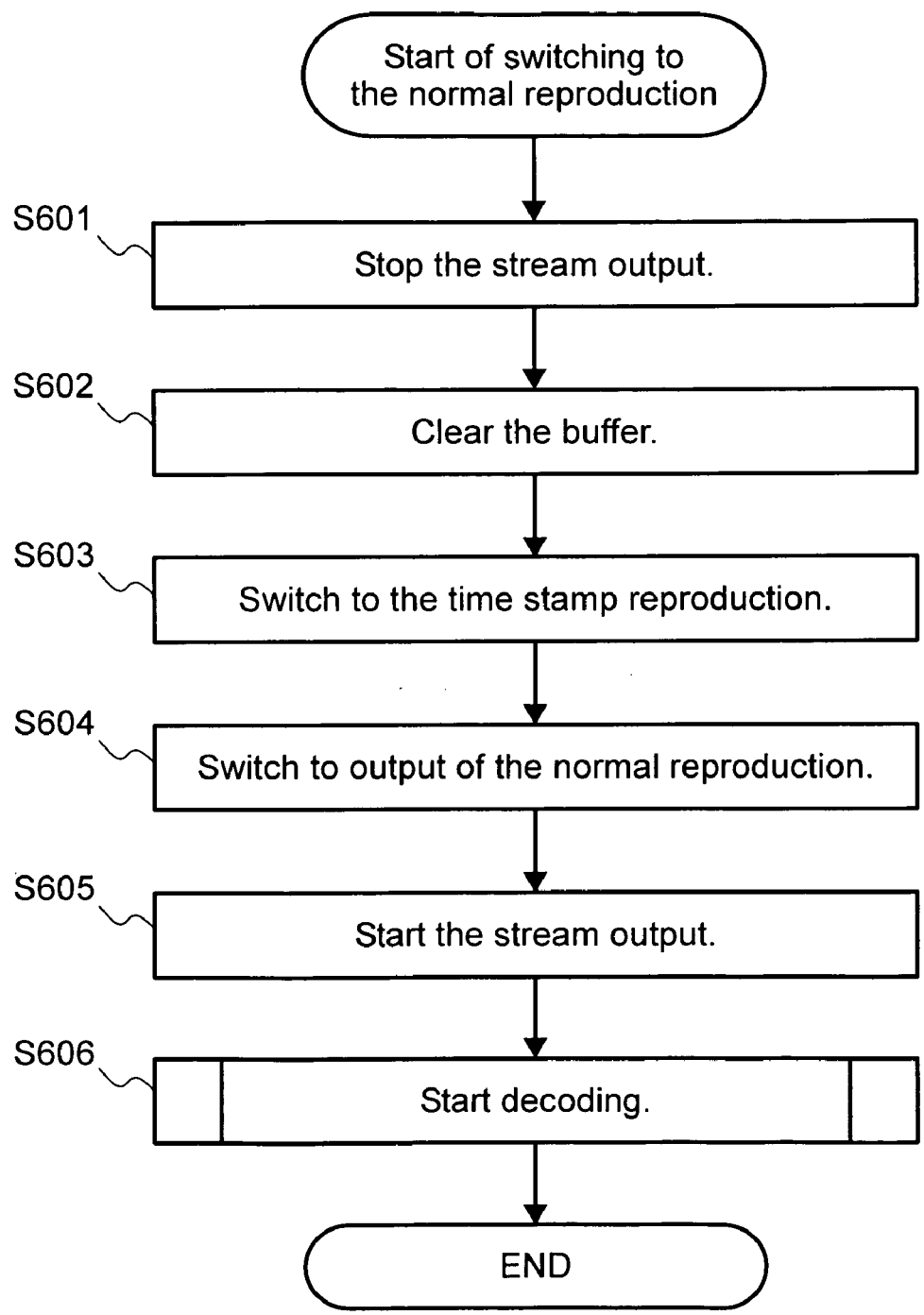
FIG. 6 is a flow chart showing procedures for switching to the time stamp reproduction according to the embodiment of the present technique.

FIG. 6 is a flow chart showing procedures to switch a special reproduction which outputs an I picture only without audio output to the normal reproduction. In S601, output of partial TS is stopped before the step moves to S602. In S602, a buffer included in the output controller 202 and a buffer in the MPEG decoder are cleared before the step moves to S603. If switching is made to the normal reproduction without clearing the buffers, the stream having only an I picture which remains in the buffers at the time of the switching is decoded/output, thus giving an uncomfortable feeling to a viewer. Therefore, by clearing the buffers to delete remaining data, switching to the normal reproduction which decodes/outputs all I, P and B pictures can be realized.

In S603, operation of the output controller 202 is switched to the time stamp reproduction before the step moves to S604. In S604, the output controller 202 changes the method for outputting partial TS from the recording medium 201 to enable output of all I, P and B pictures. Then, the step moves to S605, where output of the partial TS is initiated before moving to S606. In S606, the controller 205 changes the setup so that the reproduction method of the MPEG decoder 204 will execute normal decoding. This completes the process. For example, when switching is made from the special reproduction status to the reproduction status which requires AV synchronization, switching is executed to the time stamp reproduction technique by using similar procedures. The above special reproduction status includes high-speed reproduction using only I and P pictures and slow reproduction which does not accompany an audio output, and does not synchronize audio and video other than the above.

Examples of switching other than those exemplified in the above include switching from the normal reproduction to 1.5× fast-forwarding reproduction with voices. In the 1.5× fast-forwarding reproduction with voices, only the reproduction speed is changed while the status is kept as it is in which outputting is made with audio and video synchronized. Since no change is made for the type/sequence of pictures to be output, it is not necessary to clear the buffer and to synchronize audio and video again. As a result, in this case, it is not necessary to switch the flow control reproduction to the time stamp reproduction. Note that, however, changing to the time stamp reproduction remains to be an option.

Further, in some cases, switching is made from a reproduction status which does not perform AV synchronization to a reproduction status which does not require AV synchronization. For example, the switching is made from the forward-direction search which displays I pictures only to the backward-direction search which displays I pictures only. In this case, the buffer can be cleared as required while the flow control status is kept as it is, and the reproduction method can be changed.

As stated above, by taking reproduction statuses available before and after the switching operation into consideration, it is possible to judge whether or not the reproduction should be set to the time stamp reproduction. When the status "pause" is provided as a reproduction status, by checking only the reproduction status before switching operation, it is not possible to judge whether a change is made to the time stamp reproduction at the time of reproduction. For example, user operations are executed in the order of: "reproduction"→"pause"→"reproduction", the flow control reproduction can be left as it is without clearing the buffer. However, when the user procedures are executed in the order of: "search"→"pause"→"reproduction", the buffer must be cleared and the time stamp reproduction must be initiated. Therefore, it should be so structured that the "pause" is not recognized as a reproduction status, or alternatively, when in the "pause" status, a previous reproduction status is stored.

Figure 7:
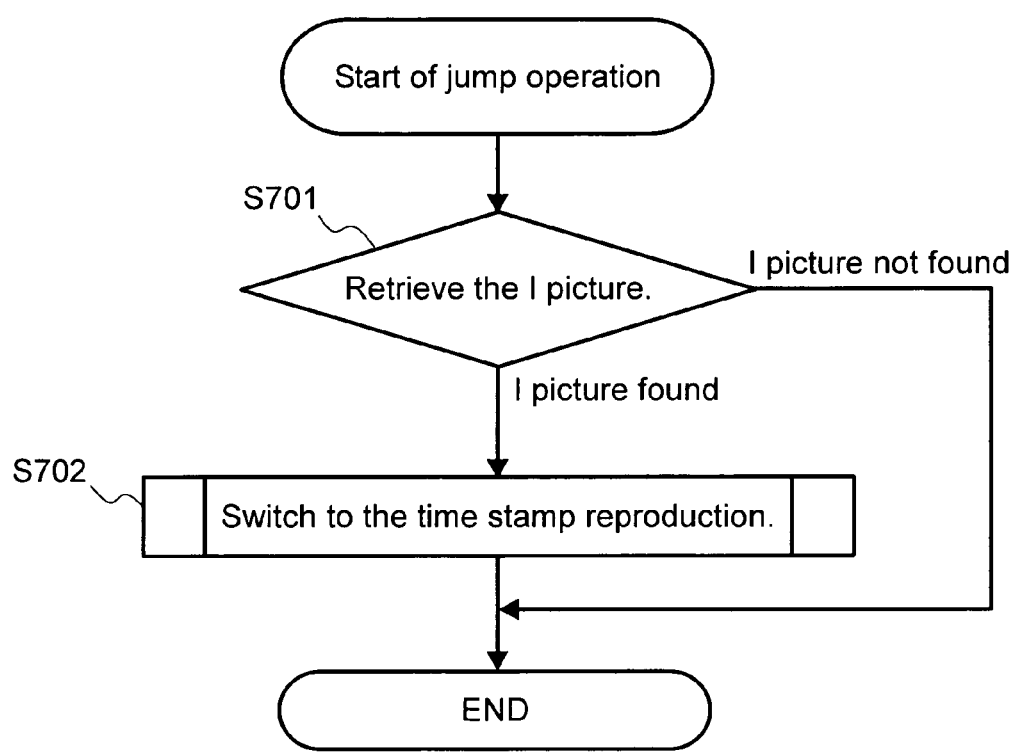
FIG. 7 is a flow chart showing procedures to initiate reproduction from a random location of partial TS according to the embodiment of the present technique.

Furthermore, for reproduction from a random-accessible recording medium, an operation that the normal reproduction is resumed by accessing a position in the recorded data designated through user operations during reproduction is also possible. For the normal reproduction is executed at the designated position in the recorded data, since it is certain that time information jumps, it is necessary to synchronize audio and video at the time of initiating reproduction after the operation, regardless of the reproduction status established before the operation. Therefore, in this case, the reproduction must be resumed with the time stamp reproduction. FIG. 7 shows a flow chart describing operations for initiating reproduction of partial TS from the designated position by means of user operations, etc. during the normal reproduction or the special reproduction.

In S701, the controller 205 retrieves an I picture existing at around the designated time. When the target I picture is found, the step moves to S702. If the target I picture is not found for the reason that the designated time is out of the range in which the stream exists, the process will be completed without executing any actions. In S702, the time stamp reproduction is initiated by executing operations similar to those shown in the flow chart in FIG. 6. This completes the process.

By taking the reproduction shown in the above-described embodiment, it is possible, in reproducing partial TS recorded on a recording medium, to execute reproduction while keeping the AV synchronization without causing overflow of the buffer at the time of initiating the normal reproduction. It is also effective to increase the size of the video buffer 2044 and the audio buffer 2047 of the decoder in terms of preventing overflow when partial TS is input from an HDD. For this reason, it is possible to reduce wait time to be set in S302 by combining this arrangement with the above-stated embodiment. Ultimately, an arrangement in which the output controller is operated without giving wait time that is set in S302, or more specifically, by processing an input under the flow control reproduction from the beginning will be included. Further, an arrangement in which processing time is abridged by including procedures for the flow control in the decoding procedures of the MPEG decoder 204 can abridge the wait time to be set in S302 in a similar way. However, either method has disadvantages such as increased resources to be prepared and increased development man-hours because of new programming work.

The process shown above works effectively regardless of types of recording medium under the conditions that a TS to be input to a decoder has time information and the time stamp reproduction is executable. With the above-described embodiment, reproduction from an HDD is employed. However, other examples may include reproduction from a DVD disc or a Blue-Ray disc. In addition, the process can be applied to all devices that have similar configurations and is capable of reproducing audio and video, without limiting the application to TV broadcasting receivers.

As described above, according to the present technique, it is possible to read a TS recorded on a recording medium, prevent stopping of an input stream caused by overflow of an STD buffer upon reproduction which requires AV synchronization, and execute reproduction under the status where components (audio and video) making up a program are kept synchronized in a favorable manner, without preparing procedures dedicated to the flow control and increasing the memory size to be used by the decoder.

Operations described above may be carried out by execution of software, firmware, or microcode operating on a processor based digital information reproducer or on a computer of any type. Additionally, code for implementing such operations may be in the form of computer instruction in any form (e.g. source code, object code, interpreted code, etc.) stored in or carried by any computer or machine readable medium.

Program aspects of the technology may be thought of as "products," typically in the form of executable code and/or associated data that is carried on or embodied in a type of machine readable medium. The executable code and/or associated data controls the operation of the broadcast receiver, recorder, computer or other programmable device for implementing the recording, playback or program guide functions. Media include any or all of the memory of the broadcast receiver or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from another computer (not shown) into the reproducing apparatus or into another element, such as a web server used for software distribution or distribution of broadcast related information. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software.

Terms regarding computer or machine "readable medium" (or media) as used herein therefore relate to any physical medium or transmission medium that participates in providing instructions or code or data to a processor for execution or processing. Such a medium may take many forms, including but not limited to, non-volatile media and volatile media as well as carrier wave and physical transmission media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A reproducing apparatus comprising:
a drive for reading from a recording medium in which a data stream containing audio, video and time information is recorded;
a controller for controlling outputting of the recorded data stream from the recording medium; and
a decoder for decoding the data stream from the drive;
wherein the controller controls output from the drive to selectively switch between: (1) reading the recorded data stream based on the time information which is recorded with the audio and video data and (2) reading the recorded data stream based on a request from the decoder, according to a predetermined condition.

2. A reproducing apparatus according to claim 1, wherein the predetermined condition is elapse of a predetermined period of time.

3. A reproducing apparatus according to claim 2, Wherein, after the elapse of the predetermined period of time, the controller switches from the reading of the recorded data stream based on the time information to the reading of the recorded data stream based on the request from the decoder.

4. A reproducing apparatus according to claim 1, wherein:
at time of initiation reproduction of the data stream recorded on the recording medium, the controller controls output from the drive to read the recorded data stream based on the time information, and
then, the controller switches from the reading of the recorded data stream based on the time information to the reading the recorded data stream based on the request from the decoder.

5. A reproducing apparatus according to claim 1, wherein the controller, when changing reproduction to normal reproduction from special reproduction, switches from the reading of the recorded data stream based on the request from the decoder to the reading of the recorded data stream based on the time information.

6. A reproducing apparatus according to claim 5, wherein:
the special reproduction is reproduction which does not synchronize audio with video, and
the normal reproduction is reproduction which synchronizes audio with video.

7. A reproducing apparatus according to claim 1, wherein the controller does not switch the reading from the drive when reading is executed based on a data request from the decoder unless the reproduction mode is changed or a data stream from the recording medium stops.

8. A reproducing apparatus according to claim 1, wherein the controller clears a buffer included in the decoder when executing the switching between reading the recorded data stream based on the time information and reading the recorded data stream based on a request from the decoder.

9. A reproducing method for reproducing audio and video data from a recording medium, comprising steps of:
reading a recorded data stream including audio, video and time information from the recording medium;
decoding the data stream as it is read from the recording medium;
switching the reading step between reading the data stream based on the time information which is recorded with the audio and video data, and reading the data stream based on a request from decoder, according to a predetermined condition.

10. A reproducing method according to claim 9, further comprising:
upon changing reproduction to normal reproduction from special reproduction, switching from reading and decoding based on a data request from the decoder to reading and decoding based on time information.

11. A reproducing method according to claim 10, wherein the special reproduction is reproduction which does not synchronize audio with video, and the normal reproduction is reproduction which synchronizes audio with video.

12. A reproducing method according to claim 9, wherein when initiating reproduction, the reading of the data stream is based on the time information, and switching to the reading of the data stream based on a data request from the decoder occurs thereafter.

13. A reproducing method according to claim 9, wherein a change from reading and decoding the data stream based on the time information to reading and decoding the data stream based on the request from the decoder is performed after elapse of a prescribed period of time of reproducing the data stream based on the time information.

14. A product comprising instructions for causing a programmable device to perform the steps of the method of claim 9 and a machine readable medium bearing the instructions.

15. A reproducing apparatus comprising:
a driving module for reading from a recording medium in which a data stream containing audio, video and time information is recorded;
a control module for controlling outputting of the recorded data stream from the recording medium; and
a decoding module for decoding the data stream from the driving module;
wherein the control module controls output from the driving module to selectively switch between reading the recorded data stream based on the time information which is recorded with the audio and video data and reading the recorded data stream based on a request from the decoding module, according to a predetermined condition.

16. A reproducing apparatus according to claim 15, wherein the predetermined condition is the elapse of a predetermined period of time.

17. A reproducing apparatus according to claim 15, wherein after the elapse of the predetermined period of time the controlling module switches from the reading the recorded data stream based on the time information to the reading the recorded data stream based on the request from the decoding module.

18. A reproducing apparatus according to claim 15, wherein:
at time of initiation reproduction of the data stream recorded on the recording medium, the controlling module controls output from the driving module to read the recorded data stream based on the time information, and
then, the controlling module switches from the reading the recorded data stream based on the time information to the reading of the recorded data stream based on the request from the decoding module.

* * * * *